Nov. 9, 1943.  W. O. SCHULTZ  2,334,131
MACHINE FOR WINDING COILS AND METHOD OF WINDING COILS
Filed Nov. 30, 1942  2 Sheets-Sheet 1

INVENTORS
WILLIAM O. SCHULTZ
ALWIN G. STEINMAYER
BY
Arthur R. Woodford
ATTORNEY.

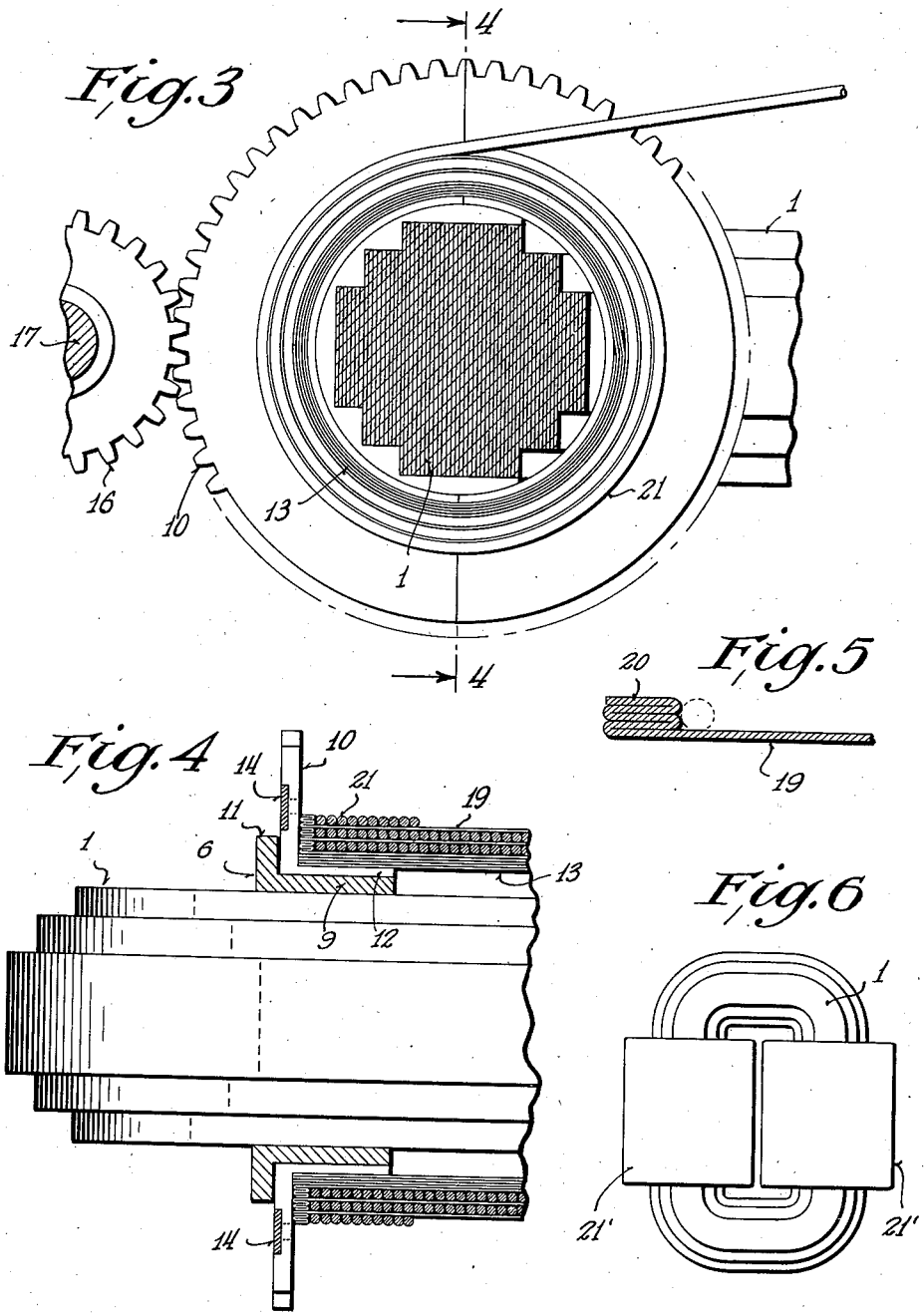

Patented Nov. 9, 1943

2,334,131

UNITED STATES PATENT OFFICE 2,334,131

MACHINE FOR WINDING COILS AND METHOD OF WINDING COILS

William O. Schultz, South Milwaukee, and Alwin G. Steinmayer, Milwaukee, Wis., assignors to Line Material Company, South Milwaukee, Wis., a corporation of Delaware Application November 30, 1942, Serial No. 467,384

11 Claims. (Cl. 242—4)

This invention relates to a machine for winding coils and to a method of winding coils.

Objects of this invention are to provide a machine and a method for winding conducting coils on an electromagnetic device, such for example as a transformer, choke coil or the like, the invention contemplating particularly the winding of a circular conducting coil on a closed magnetic core after the core has been completely formed and annealed.

Further objects are to provide a winding machine for winding a conducting coil on a closed magnetic core, the machine being so constructed that bearing members are removably positioned in spaced relation to each other and held in place adjacent opposite ends of a section of the closed magnetic core and partially encircle the core, in which multi-section flange members are revolubly mounted on the spaced bearing members and are provided with means for detachably locking the sections of each flange member together so that the several elements of each flange member constitute, when so locked together, a unitary structure, and to provide means for rotating the flange members simultaneously.

In greater detail, further objects are to provide a machine having the characteristics enumerated hereinabove in which the flange members are each provided with inwardly extending cylindrical flanges, in which the shell is wound from a strip of insulating paper or other material and is left in place on the core as a permanent part of the finished device after completion of the winding operation.

Further objects are to so arrange the driving means for the flange elements hereinabove referred to that the thrust from the driving means is in a direction to hold the flange members revolubly in contact with the bearing members and thus keep the flange members out of engagement with the magnetic core, and to direct the wire being wound onto the coil in such a way that the pull from the oncoming wire also assists in holding the flange members on the bearing members and out of contact with the core.

Further objects are to provide a method of winding a conducting coil on a closed magnetic core which will result in the rapid and accurate formation of the conducting winding, which allows the inner shell to be built up from a sheet of insulating material prior to the winding of the wire thereon and allows the shell to be left in place after the winding has been completed, the shell forming a permanent part of the finished structure.

Further objects are to provide a winding machine in which a main frame member is provided with means for clamping the core in place and is provided with the bearing members hereinabove described, such bearing members partially encircling an unclamped portion of the core and acting not only to provide bearing portions but also acting to assist in holding the core in place on the machine, and in which the bearing members are readily removable and after removal permit the free and easy removal of the hereinbefore described flange members.

An embodiment of the invention is shown in the accompanying drawings, in which:

Figure 3 is a line section on the line 3—3 of Figure 1 drawn to an enlarged scale.

Figure 4 is a sectional view on the line 4—4 of Figure 5.

Figure 5 is a fragmentary sectional detail through one of the layers of insulating material interposed between successive layers of the winding.

Figure 6 is a view of the finished transformer.

It is to be understood that the invention while particularly useful in winding a conducting coil around a closed magnetic core is nevertheless also applicable to the winding of the conducting coil whether or not the core is a closed magnetic core.

It is to be understood that where the expression "conducting winding" is employed that the winding may comprise either a single continuous winding or several independent windings, such, respectively, as those employed on choke coils and on transformers.

Figure 1:
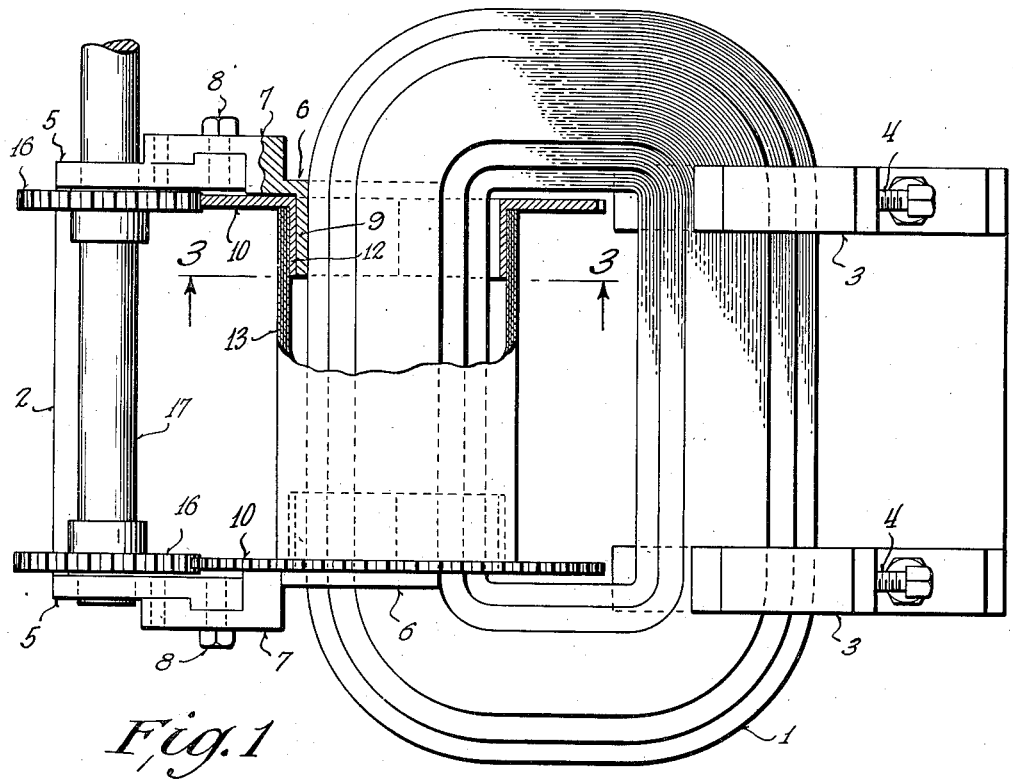
Figure 1 is a plan view, with parts broken away and in section, showing the winding machine and showing a magnetic core clamped in position.
Figure 2:
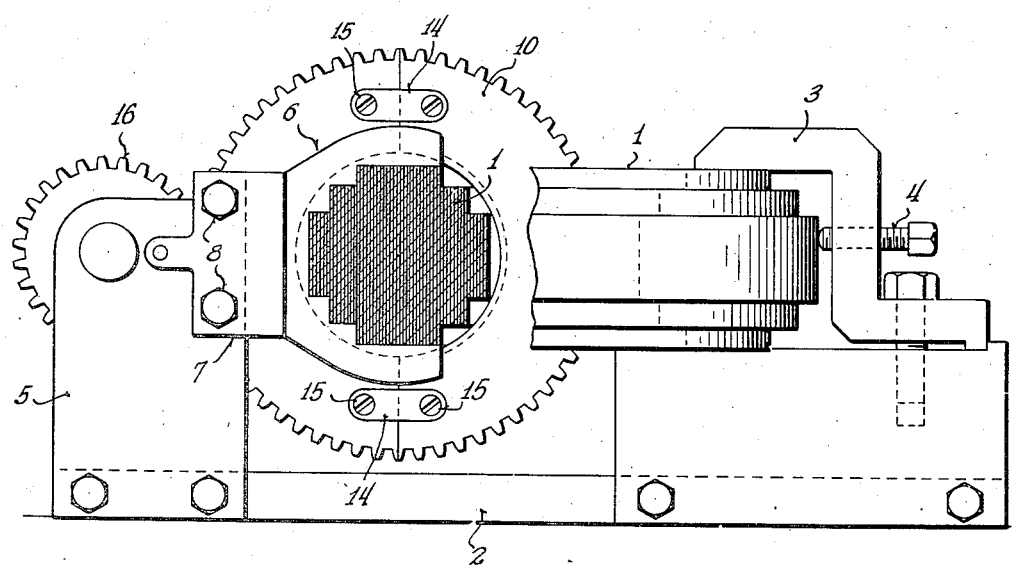
Figure 2 is a side elevation of the structure shown in Figure 1, a part of the core being broken away and in section.

Referring to the drawings, it will be seen that the core of the transformer is closed and is formed by winding a strip or strips of magnetic material to form a compact and solid structure, the successive layers of material being preferably of different widths to provide the cruciform shape of core as shown in Figure 2.

The core is indicated by the reference character 1 and the making of the core does not form any part of this invention. The finished, annealed core is held clamped to a main frame like structure 2 by any suitable clamping means, such as the pair of clamping means illustrated and indicated by the reference character 3. Each clamping means may be provided with a set screw 4 threaded therethrough and bearing against the core.

At the other side of the machine uprights 5 are provided and removably carry bearing members indicated generally by the reference character 6. These bearing members may include plate like structure 7 which removably interlock with the uprights 5 and which are held in place by means of bolts or screws 8. The bearing members extend inwardly of the machine towards the clamping means 3 and partially enclose the magnetic core 1, as shown most clearly in Figure 2.

These bearing members 6 are provided with cylindrical inner portions 9, see Figure 4, which extend part way around the core and which form the actual bearing surfaces upon which the flange members 10 are revolubly supported. It is to be noted that the bearing members 6 are also provided with marginal flanges 11, see Figure 4, which limit the lateral movement outwardly of the flange members 10. The flange members 10 are provided with inwardly extending cylindrical flange portions 12 on which the insulating sleeve 13 is wound, as will appear hereinafter, it being noted that the sleeve 13 keeps the flange members 10 spaced apart and that the flanges 11 of the bearing members 6 keep the flange members 10 from moving outwardly out of position.

The flange members 10 are formed of two or more parts, two parts having been indicated in Figure 2. These parts or elements of the flange members 10 are detachably locked together in any suitable manner, as by means of the small link like members 14 which are inset within recesses formed in the flange members 10, as shown most clearly in Figure 4. The locking members 14 are provided with apertures at their opposite ends through which screws 15 extend, such screws being threaded into the flange members 10 and thus holding the links 14 in place and locking the elements of the flange members 10 together.

Any suitable driving means, preferably a power drive, may be employed for simultaneously driving the flange members 10. If desired and as shown in the drawings, the flange members 10 are provided with gear teeth which mesh with a pair of pinions 16 carried on the power-driven shaft 17.

It will be seen from the description thus far given that when the shaft 17 is rotated, it will simultaneously rotate the flange members 10. It is to be noted that the thrust from the gears is inwardly towards the central part of the machine in such a direction that this thrust tends to hold the flange members 10 in engagement with the bearing members indicated generally at 6.

In following the process, assuming the machine is assembled as shown, the power or other driven shaft 17 is rotated to thereby simultaneously rotate the flange members 10. While the flange members are being rotated, a sheet or strip of insulating material, such as impregnated paper for instance, is wound on the inwardly turned flanges 12 of the flange members 10. It is preferable to put shellac on at least the first portion of the strip so as to cement the layers or at least the inner layers together adjacent their starting point. The winding of this strip of sheet material continues until a shell of the requisite strength and thickness is formed. This shell or sleeve is indicated by the reference character 13. After a sufficient thickness of the shell has been built up, the end portion of the outermost layer at least is shellacked so as to adhere to the adjacent layer of the shell and prevent inadvertent unwinding thereof. Other binding agents may be employed in place of shellac and it is obvious that the entire strip of sheet material forming the shell may be coated with a binding agent or only the beginning and end portions thereof may be coated.

After the shell has been formed, the outer layer indicated by the reference character 19 is wound directly on the shell. This outer layer is also of insulating sheet material, such as impregnated paper, and has its marginal edges folded back and forth to form a thickened marginal portion approximately equal to the diameter of the wire, as shown in Figure 5. The thickened marginal portion of the sheet material 19 is indicated by the reference character 20. After one layer of this sheet material has been positioned around the shell, the first layer of the conducting winding indicated generally by the reference character 21 is wound in place. Thereafter another layer of sheet material 19 with its thickened marginal edges 20 is positioned on the finished wound layer of the conducting coil and a second layer of conducting coil is formed.

This process is continued until the requisite number of layers of conducting coil have been wound in place. Thereafter the coil is finished or covered or fastened in any suitable manner.

The particular way the coil is formed or the end leads or the intermediate leads arranged forms no part of this invention other than as set forth herein.

After the conducting coil has been completely wound, the bolts 8 are removed and the bearing members 6 are slid outwardly in opposite directions from within the annular flanges 12 of the flange members 10. Thereafter the locking means 14, see Figure 2, are removed and the flange members 10 are removed in sections, thus leaving the finished coil in place on the permanently positioned inner shell or sleeve 13.

The transformer core is then reversed and either the same or other clamping means 3 are employed, to clamp the core in place so that the other leg of the core may be wound as described hereinabove. The finished transformer is indicated in Figure 6 and the completely finished conducting windings are indicated by the reference character 21'.

It is to be noted that the direction of pull of the wire as it is being wound to form the conducting winding is in such a direction, as is apparent from an examination of Figure 3, as to assist in holding the flange members 10 in engagement with their supporting members 6 and out of contact with the core so that no damage is done to either the shell, the winding, or the core during the forming of the conducting winding.

It is obvious that either machines of different sizes or having adjustable parts may be employed for winding conducting windings on cores of different sizes or lengths.

It is to be noted that the cores even for transformers of any given size vary slightly and are not always wholly straight and true. Even under these conditions the machine hereinabove described may be satisfactorily employed for it is to be noted that the bearing members 6 though shown in actual contact with the core 1, need not necessarily be in contact with the core throughout the entire surface of such bearing members but may be spaced from some portions or from all portions thereof if desired.

It is preferable, however, to adjust the set screws 4 so as to force the cores into firm engagement with the bearing members 6 so that the cores are supported at both sides and are thereby rigidly carried by the machine. Also it is to be noted that the flange members are held out of contact with the core and that they are freely rotated simultaneously during the process of forming the conducting coil.

It will be seen also that the machine is of very simple construction and has a small number of relatively sturdy parts. It is easy to operate and does not require a skilled operator.

Although this invention has been described in considerable detail, it is to be understood that such description is intended as illustrative rather than limiting, as the invention may be variously embodied and is to be interpreted as claimed.

We claim:

1. The method of winding a conducting coil on a magnetic core, said method comprising the steps of placing a pair of bearing members closely adjacent said core in spaced relation lengthwise of the adjacent portion of said core, revolubly supporting cylindrical flanges on said bearing members, supporting a shell of insulating material on said flanges, rotating said cylindrical flanges, winding a conducting winding on said shell, removing the bearing members and cylindrical flanges and leaving the shell and the conducting coil as a permanent part of the resulting device.

2. The method of winding a conducting coil on a magnetic core, said method comprising the steps of placing a pair of bearing members closely adjacent said core in spaced relation lengthwise of the adjacent portion of said core, revolubly supporting cylindrical flanges on said bearing members, rotating said cylindrical flanges, winding a sheet of insulating material on said flanges until said sheet is formed into a rigid, multi-layer shell, winding a conducting winding on said shell, removing the bearing members and cylindrical flanges and leaving the multi-layer shell and the conducting coil as a permanent part of the resulting device.

3. A machine for winding a conducting coil on a closed magnetic core comprising a pair of segmental bearing members, means for removably holding said bearing members in spaced relation with each bearing member encircling a part of said core, a pair of multi-section flange members removably and revolubly supported by said bearing members in spaced relation to each other and each having a cylindrical flange extending towards the other flange member and adapted to extend into and support a shell on which the conducting winding is to be wound out of contact with the core, and means for rotating at least one of said flange members.

4. A machine for winding a conducting coil on a magnetic core comprising a pair of segmental bearing members, means for removably holding said bearing members in spaced relation with each bearing member encircling a part of said core, a pair of multi-section flange members removably and revolubly supported by said bearing members in spaced relation to each other and each having a cylindrical flange extending towards the other flange member and adapted to extend into and support a shell on which the conducting winding is to be wound out of contact with the core, each flange member having locking means for detachably locking the sections of such flange member together to form such flange member into a rigid unitary structure, and means for rotating at least one of said flange members.

5. A machine for winding a conducting coil on a magnetic core comprising a pair of segmental bearing members, means for removably holding said bearing members in spaced relation with each bearing member encircling a part of said core, a pair of multi-section flange members removably and revolubly supported by said bearing members in spaced relation to each other and each having a cylindrical flange extending towards the other flange member and adapted to extend into and support a shell on which the conducting winding is to be wound out of contact with the core, each flange member having locking means for detachably locking the sections of such flange member together to form such flange member into a rigid unitary structure, said flange members having recesses for receiving said locking means, and means for rotating at least one of said flange members.

6. A machine for winding a conducting coil on a magnetic core comprising a pair of segmental bearing members, means for removably holding said bearing members in spaced relation with each bearing member encircling a part of said core, a pair of multi-section flange members removably and revolubly supported by said bearing members in spaced relation to each other and each having a cylindrical flange extending towards the other flange member and adapted to extend into and support a shell on which the conducting winding is to be wound out of contact with the core, said bearing members having means for guiding said flange members when said flange members are rotated, and means for rotating at least one of said flange members.

7. A machine for winding a conducting coil on a magnetic core comprising a pair of segmental bearing members, means for removably holding said bearing members in spaced relation with each bearing member encircling a part of said core, a pair of multi-section flange members removably and revolubly supported by said bearing members in spaced relation to each other and each having a cylindrical flange extending towards the other flange member and adapted to extend into and support a shell on which the conducting winding is to be wound out of contact with the core, and means for simultaneously rotating both of said flange members.

8. A machine for winding a conducting coil on a closed magnetic core comprising a pair of segmental bearing members, means for removably holding said bearing members in spaced relation with each bearing member encircling a part of said core, a pair of multi-section flange members removably and revolubly supported by said bearing members in spaced relation to each other and each having a cylindrical flange extending towards the other flange member and adapted to extend into and support a shell on which the conducting winding is to be wound out of contact with the core, said bearing members having means for preventing said flange members from shifting in a direction away from each other, and means for rotating at least one of said flange members.

9. A machine for winding a conducting coil on a closed magnetic core comprising a pair of segmental bearing members, means for removably holding said bearing members in spaced relation with each bearing member encircling a part of said core, a pair of multi-section flange members removably and revolubly supported by said bearing members in spaced relation to each other and each having a cylindrical flange extending towards the other flange member and adapted to extend into and support a shell on which the conducting winding is to be wound out of contact with the core, said bearing members having means for preventing said flange members from shifting in a direction away from each other, each flange member having locking means for detachably locking the sections of such flange member together to form such flange member into a rigid unitary structure, and means for rotating at least one of said flange members.

10. A machine for winding a conducting coil on a closed magnetic core comprising a body frame member, clamping means for clamping a closed magnetic core to the frame member, power means at the other side of said frame member from said clamping means, removable bearing members carried by said frame member in a rigid and non-movable manner when secured to said frame member, said bearing members including arcuate portions partially surrounding a part of said magnetic core, revoluble flange members operatively coupled to said power means and revolubly mounted on said bearing members, said flange members including inwardly directed cylindrical flange portions adapted to extend into and support a shell, said flange members being adapted to be simultaneously rotated by said power means to drive said shell, said power means having a thrust in a direction to hold said flange members in contact with said bearing members and out of engagement with the core, whereby said flange members may be rotated to thereby rotate the shell so that a conducting winding may be wound on said rotating shell.

11. A machine for winding a conducting coil on a magnetic core comprising a frame member, clamping means for holding said core rigidly to said frame member, bearing members removably attached to said frame member in a rigid manner and adapted to encircle a part of said magnetic core, a pair of flange members revolubly supported on said bearing members and having gear teeth formed in their marginal portions and having inwardly directed cylindrical flanges, and power means including a pair of gears meshing with the gear teeth of said flange members, and means for simultaneously rotating said gears, the thrust between said gears and the gear teeth formed on said flange members being in a direction to hold said flange members in contact with said bearing members.

WILLIAM O. SCHULTZ.
ALWIN G. STEINMAYER.